Sept. 27, 1949.   T. N. YOUNG ET AL   2,483,082
REPAIRING WATER PIPES AND EQUIPMENT FOR USE THEREIN
Filed Nov. 26, 1945   6 Sheets-Sheet 1
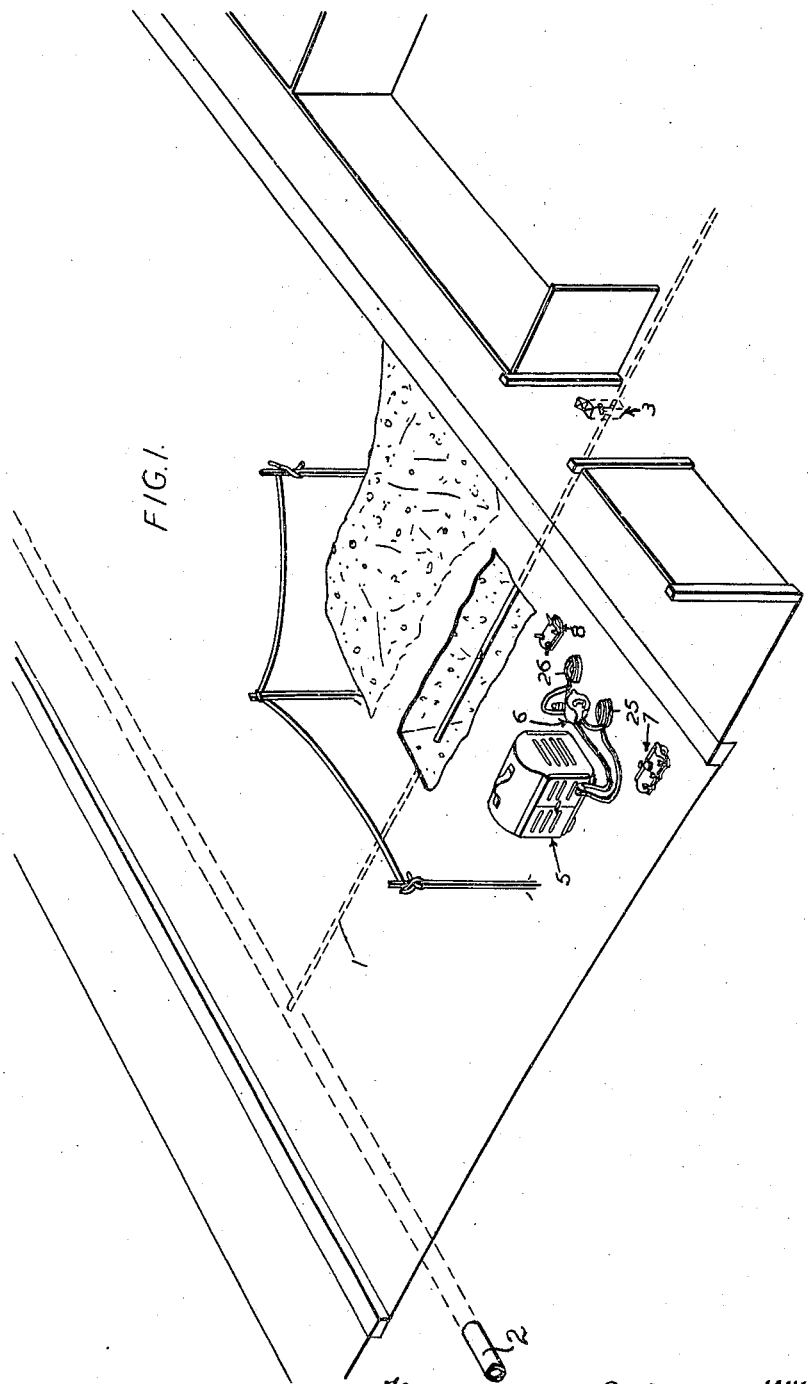

Sept. 27, 1949.   T. N. YOUNG ET AL   2,483,082
REPAIRING WATER PIPES AND EQUIPMENT FOR USE THEREIN
Filed Nov. 26, 1945   6 Sheets-Sheet 2
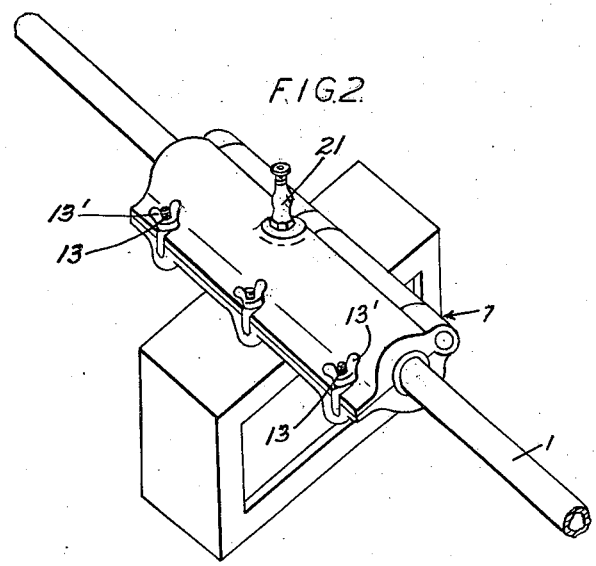
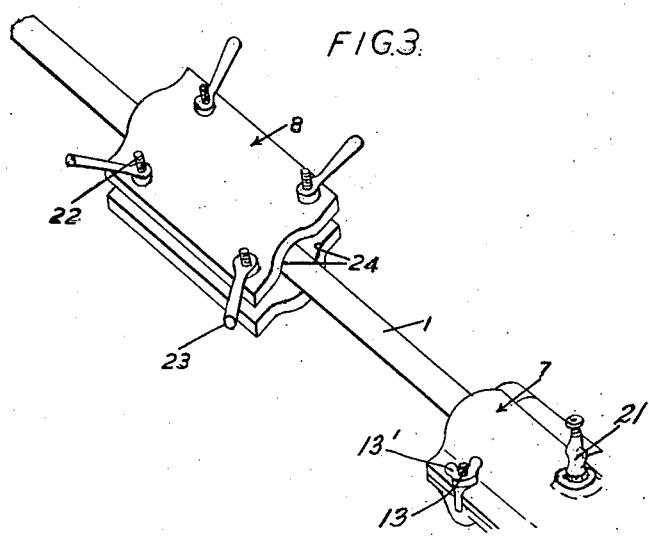

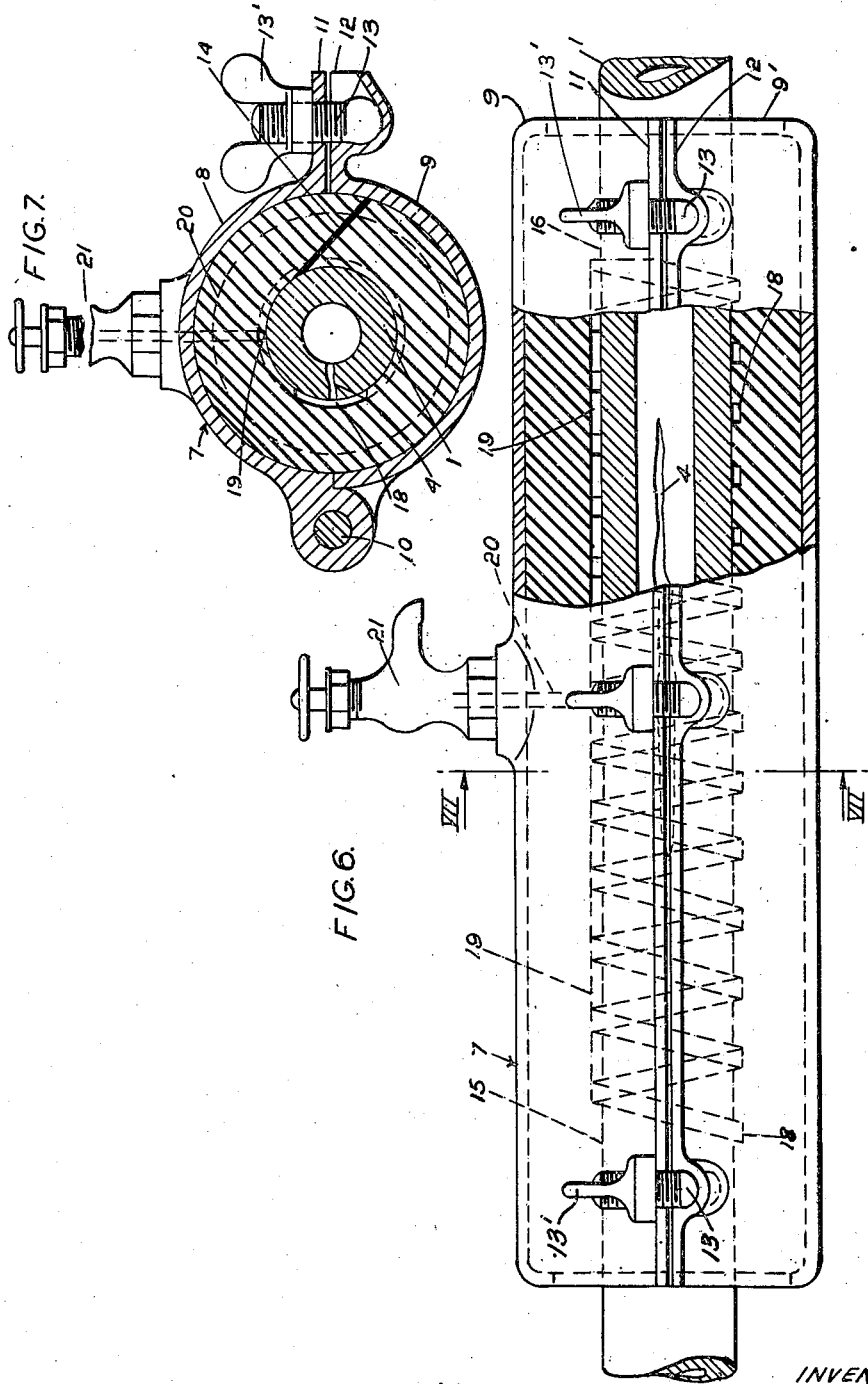

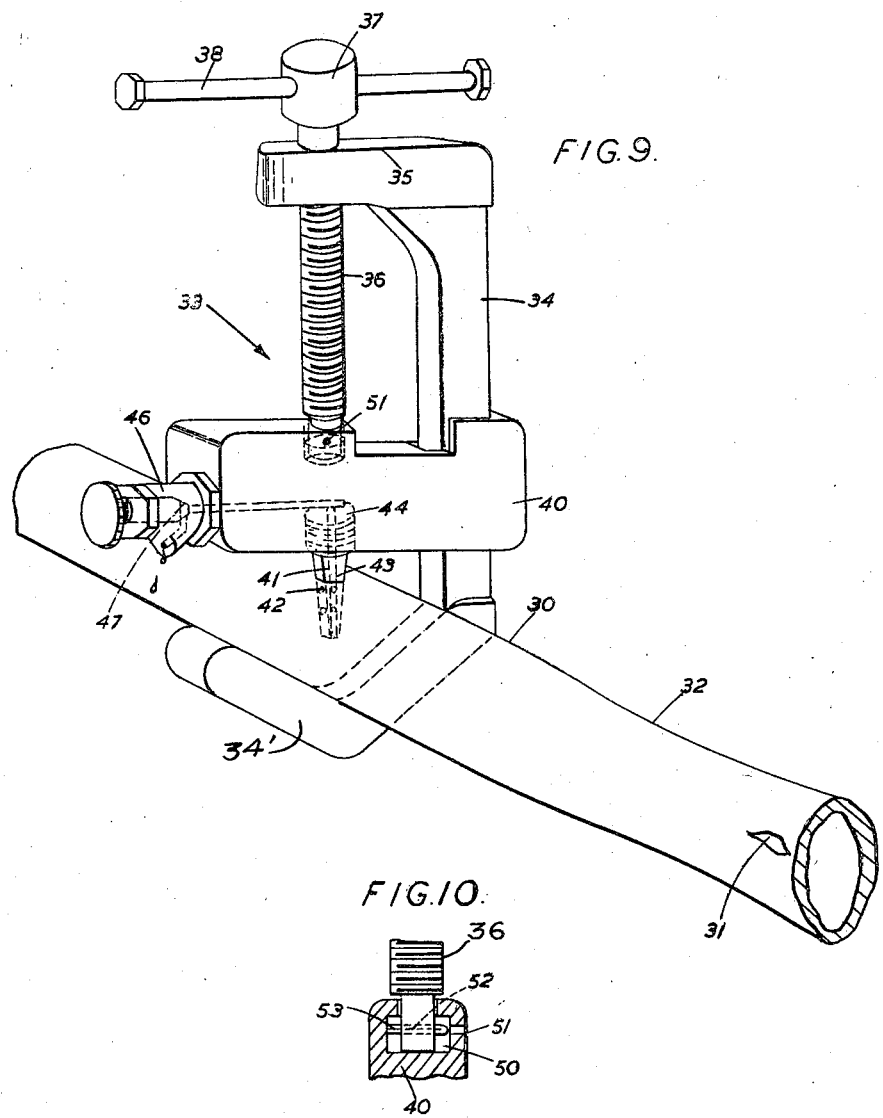

Patented Sept. 27, 1949

2,483,082

UNITED STATES PATENT OFFICE 2,483,082

REPAIRING WATER PIPES AND EQUIPMENT FOR USE THEREIN

Thomas Nicholas Young, Epsom, and Eric Guy Brian Gledhill, Sutton, England, assignors to Freez-Seal Equipment Company Limited, New Malden, England, a British company Application November 26, 1945, Serial No. 630,903 In Great Britain December 18, 1944

10 Claims. (Cl. 138—97)

In supplying water to domestic and other premises, it is common practice to connect the premises to mains by separate service pipes. Most of these service pipes are of standard small sizes and are fitted with stop-cocks. If a burst occurs on a service pipe between the main and the stop-cock, or if the stop-cock is defective and in need of repairs, it is necessary to cut off the water from the service pipe concerned before the necessary repair work can be undertaken. This is done by shutting valves on the individual main which supplies the service pipe so as to isolate the part of the main in question, and after the valves on the main have been closed, the main and service pipe have to be emptied. The act of emptying the main also empties all the service pipes supplying premises in the same road or district, and this puts the water consumers to considerable inconvenience and is a source of annoyance and complaint.

To avoid these inconveniences, we have devised apparatus, some of which are described and claimed in our application Serial No. 623,308, filed October 19, 1945, for temporarily freezing a short length of the pipe so as to stop the flow through it while the repair is being effected or any other operation is being performed.

Naturally, in deliberately freezing a pipe containing water or other liquid, there is a risk of bursting or straining the pipe or damaging fittings connected with it. The primary object of this invention is to provide a method of freezing a pipe in which any risk of bursting or straining the pipe is eliminated.

A further object is so to freeze a water pipe that a hollow plug of ice gradually building up radially inwards forms within the pipe.

Another object is to provide an improved method of repairing a water pipe.

Yet a further object is to provide improved equipment for use in repairing water pipes.

According to this invention we reduce the flow through the pipe to a controlled trickle or drip and at a point where this trickle or drip is flowing, we freeze the liquid in the pipe. In this way we can stop the flow completely without damaging the pipe. When a water pipe is treated in this way, we find that the ice plug created within the pipe is formed initially as a hollow plug free to expand both radially inwards and along the axis of the pipe until the freezing process is complete and the flow along the pipe is stopped by a solid plug without any significant expansion of, or strain in, the metal or other material of the pipe. It seems that the ice plug, which is at first of a tubular section, builds up gradually with a diminishing bore from each end of the plug, until the plug is completely formed, and that during the building-up process, the pressure of the water both in the bore of the plug and on each side of it never exceeds the pressure at which the liquid is supplied.

To produce the controlled trickle or drip, we prefer to make a bleed port or outlet in the pipe downstream of the length to be frozen or to provide such a bleed port or outlet by a device assembled around a hole or split in the pipe and serving to restrict the flow from the hole or split to the desired trickle or drip. In the former case, the pipe may be deformed by external pressure to close it completely at a point downstream of the length to be frozen, and either a small hole may then be made between this point and the length to be frozen, or a somewhat larger hole may be made and an attachment inserted to reduce the flow to the desired trickle or drip. In the latter case the device may make close contact with the pipe at each end and present a small outlet for the escape of the water to the outside. Such a device may comprise a two-part clip lined with rubber which rubber is grooved or recessed to lead the water to a drip cock. In any case, the bleed port or outlet serves the purely temporary purpose of allowing flow to take place at the rate of a trickle or drip while the pipe is being frozen to stop the flow completely, and when the freezing is complete, the length of the pipe containing the hole (whether the hole was deliberately formed or constituted the damage to be repaired) may be cut out and replaced by a sound part as part of the repair or other operation. Thereafter the frozen length is thawed.

To enable the invention to be more fully understood, a detailed description of one complete repairing operation and of the preferred equipment used in it will now be given with reference to the accompanying drawings, in which:

Figure 1 shows a typical situation in which a service pipe must be repaired;

Figures 2, 3, 4 and 5 illustrate four successive stages in the repairing operation;

Figure 6 is an elevation, partly in section, of a clip used in the process;

Figure 7 is a section on the line VII—VII in Figure 6;

Figure 9 illustrates the use of a modified piece of equipment; and

Figure 10 is a fragmentary, vertical view, partly in section, of a detail of the device shown in Figure 9.

Figure 4:
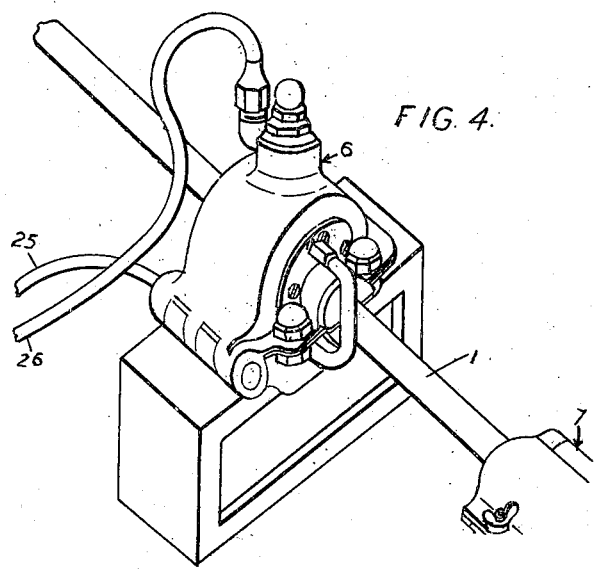

Referring first to Figure 1, it is assumed that a water service pipe 1 made of iron and leading from a main 2 to domestic premises, is controlled by a stop-cock 3 and has burst between the said stop-cock and the said main, the burst resulting in a split indicated at 4 in Figure 6. To perform the necessary repairs, a portable plant 5, constructed as described in our said application Serial No. 623,308 and including a two-part container 6 for assembly around a length of the pipe, the plant and container together constituting a mechanical refrigerating apparatus, is brought to the site. The equipment brought to the site also includes a two-part clip 7 and a device 8 for straightening the pipe.

First the stop-cock 3 is closed and then the clip 7 is assembled around the split 4. This clip consists of two semi-cylindrical metal parts 9 and 9' hinged together at 10 and provided with co-operating flanges 11 and 12 through which they can be secured together by bolts 13 on which are threaded butterfly nuts 13' so that the whole device can be tightened around the pipe. Internally the device is provided with a rubber lining which is split as shown at 14 so that it can be opened out to engage over the pipe and will thereafter close tightly on the pipe. At each end, this rubber lining makes close contact with the pipe as shown at 15 and 16, but for the greater part of its length it is formed with a continuous helical groove 18, the turns of this groove being connected by an axial groove 19 so that water escaping through the split 4 is led by the groove 18 to the groove 19. A radial bore 20 is also made in the rubber lining and leads from the groove 19 to an adjustable drip cock 21. When the complete device has been assembled around the pipe 1, as shown in Figure 2, the drip cock 21 is adjusted until water flows through it as a trickle.

Figure 5:
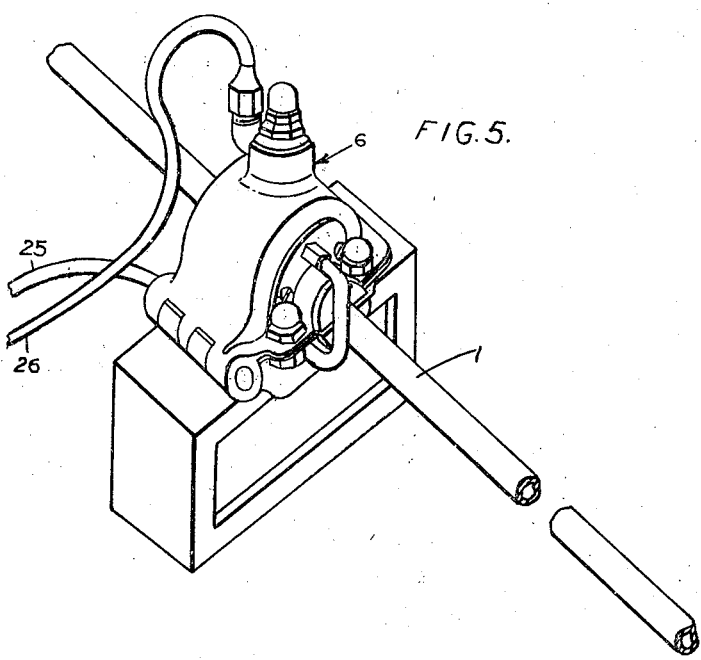
Figure 8:
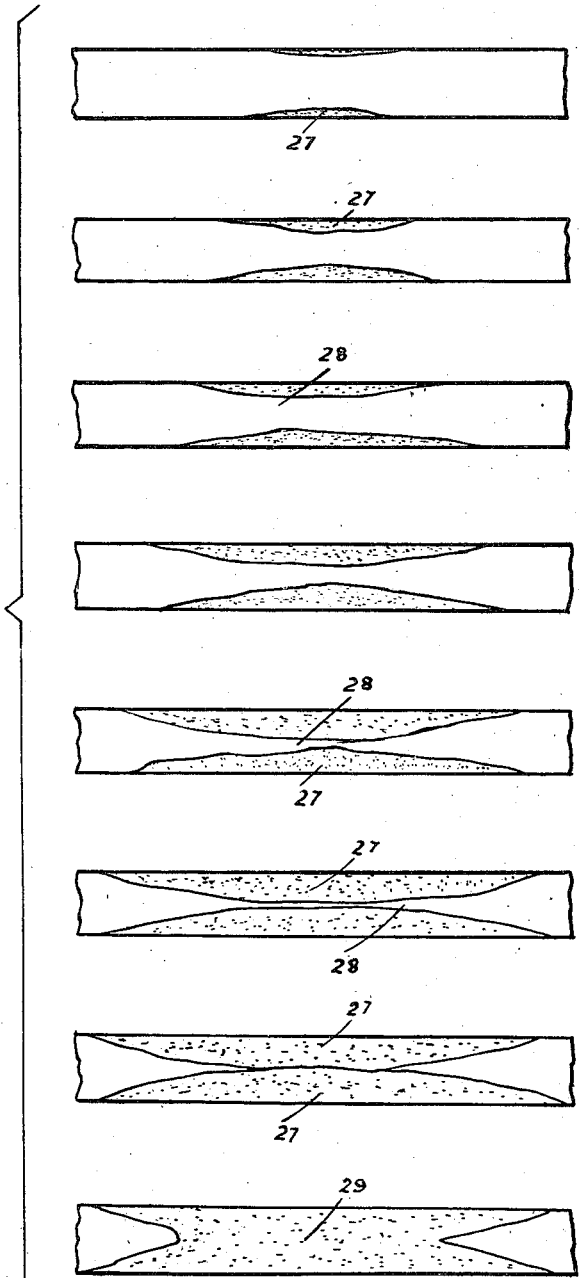
Figure 8 illustrates stages in the formation of the ice plug.

Next, unless the pipe 1 is absolutely straight, a length of it between the clip 7 and the main 2 is straightened by means of the two-part straightening device 8. As shown in Figure 3, this device includes bolts 22 on which handled nuts 23 are tightened up so as to compress the pipe 1 between two parallel grooves 24 on the two opposed parts of the device. The device 8 is then removed and the refrigerating container 6 is assembled around the straightened length of pipe. In carrying out the present invention, any type of refrigerating apparatus may be used, but the container 6 illustrated constitutes an expansion chamber for refrigerant circulated through pipes 25 and 26 by a compressor driven by a small internal-combustion engine, both these machines forming part of the portable plant 5. As a result of the circulation of the refrigerant, the water flowing through the straightened length of pipe is frozen in the successive stages illustrated by Figure 8, which shows clearly how a hollow plug 27 of ice builds up around a bore 28 until the plug becomes solid as shown at 29. In consequence, there is no risk of the pipe bursting or being strained because of radial expansion of the internal ice plug. As soon as this plug 29 has been formed so that flow has been stopped upstream of the clip 7, the latter is removed and the defective length of pipe cut out as shown in Figure 5. A sound length of pipe is then inserted and the repair is then complete. The refrigerating container 6 may then accordingly be removed and the frozen length of pipe thawed. If desired, the thawing may be accelerated by heating the pipe with a burner flame or otherwise.

The clip 7 is particularly useful when the pipe to be repaired is made of iron. When the pipe is made of lead, it is easy to form a hole in it for the purpose of allowing the water to flow as a trickle or drip, and this is often simpler than surrounding the damaged part by a device such as the clip 7. Figure 9 shows a lead pipe 30 which is defective as shown at 31 and which must, accordingly, be repaired. First the pipe 30 is subjected to external pressure to close it completely in the area 32, which area is upstream of the defect 31. Then at a point further upstream, a device 33 constituting a combined hollow piercer and dripcock and including means for engaging the pipe and driving the piercer into the pipe, is assembled around the pipe. This device 33 comprises a frame 34 with a V-shaped bottom portion 34' which hooks round the pipe, and an upper arm 35 tapped to receive a threaded spindle 36. The head 37 of this spindle 36 receives a transversely-disposed sliding handle 38 by means of which the spindle 36 may be rotated. The lower end of the spindle 36 enters an undercut recess 50 in a cross-member 40, which cross-member is mounted to slide vertically on the frame 34. A bore 51 is made in the cross-member 40 through the wall defining the recess 50, and the end of the spindle 36 is formed with a transverse hole 52 for the receipt of a split-pin 53. This pin is inserted while the hole 52 is in register with the bore 51, and when it is in position in the spindle it lies wholly within the recess 50 but overlaps the edges of the upper opening of that recess. Accordingly, by turning the spindle 36 in one direction, its lower end will bear on the base of the recess 50 and will force the cross-member 40 downwards, and on turning the spindle 36 in an opposite direction, the cross-member 40 will be moved upwards due to the engagement of the end of the split pin 53 with the undercut walls defining the top of recess 50.

The underside of the cross-member 40 is formed with a threaded socket 44 which receives the head of a plug 41. This plug projects out from the socket and has a shank which is made of a hard metal and is square in cross-section. The plug acts as a piercer and draw-off device for liquid, so the end of its shank is of small cross-section and perforations 42 leading to an axial bore 43 are made in the wall of the shank. The bore 43 opens into the base of the socket 44 and a passage 45 runs from this through the cross-member 40 to a drip-cock 46 provided with an adjustable needle valve 47.

In operation, the assembly of the device 33 around the pipe is effected by raising the cross-member 40 by rotating the spindle 36 sufficiently to permit the V portion 34' of the frame 34 to engage beneath the pipe 30, and the spindle 36 is then rotated by means of the sliding handle 38 to cause the perforated and tapered shank of the plug 41 to be forced through the wall and into the bore of the pipe 30. This action securely fixes the whole device 33 to the pipe and also effectively seals the tapered shank of the plug 41 in the pipe. By adjusting the needle valve 47, a steady drip is obtained and the pipe can then be frozen upstream of the device 33 by the refrigerating container 6 as described above in connection with Figures 1 to 8, the length to be frozen being first straightened if necessary. Once the pipe has been frozen, the whole device 33 can be removed and the complete length containing the hole made by the shank of the plug 41, the closed part 32 and the defect 31, can be cut out and replaced by a sound length.

We claim:

1. A method of stopping the flow of liquid through a pipe to permit removal and replacement of a damaged portion of said pipe, which consists in initially reducing the flow of liquid through the pipe to a controlled trickle which escapes as a drip at a point intermediate the ends of the pipe, and then freezing the water within a section of the pipe upstream with respect to the point of escape of the drip to thus form an ice plug within said section which completely stops the flow of liquid through the pipe.

2. A method of stopping the flow of liquid through a pipe as defined in claim 1, in which there is a hole in the damaged portion of the pipe, and in which the initial reduction of flow to a controlled trickle is effected by controlling the escape of the drip through said hole.

3. A method of stopping the flow of liquid through a pipe as defined in claim 1, in which a perforation is made in the pipe at a point upstream with respect to the damaged portion of said pipe and downstream with respect to the section of the pipe in which the liquid is to be frozen, and in which the initial reduction of flow to a controlled trickle is effected by controlling the escape of the drip through said perforation.

4. A method of repairing a damaged intermediate portion of a liquid-conveying pipe which consists in initially reducing the flow of liquid through the pipe to a controlled trickle which escapes as a drip at a point intermediate the ends of the pipe; freezing the water within a section of the pipe upstream with respect to the point of escape of the drip, and also upstream with respect to the damaged portion of said pipe, to form an ice plug within said section which completely stops the flow of liquid through the pipe; removing the damaged portion of said pipe; replacing said portion by a sound portion; and then thawing the section of the pipe to remove the ice plug therefrom.

5. A method of stopping the flow of liquid through a pipe to permit removal and replacement of a damaged intermediate portion of said pipe, which consists in completely stopping the flow of liquid through said pipe at a point upstream with respect to said damaged portion, making a perforation in said pipe for the escape of liquid at a point upstream with respect to the area of complete stoppage, controlling the flow of liquid through said perforation to initially reduce the flow of liquid through the part of said pipe upstream with respect to said stoppage to a controlled trickle, and then freezing the water within a section of the pipe upstream with respect to said perforation to thus form an ice plug within said section which completely stops the flow of liquid through said pipe.

6. A method of repairing a damaged intermediate portion of a liquid-conveying pipe which consists in completely stopping the flow of liquid through said pipe at a point upstream with respect to said damaged portion, making a perforation in said pipe for the escape of liquid at a point upstream with respect to the area of complete stoppage, controlling the flow of liquid through said perforation to initially reduce the flow of liquid through the part of said pipe upstream with respect to said stoppage to a controlled trickle, freezing the water within a section of the pipe upstream with respect to said perforation to thus form an ice plug within said section which completely stops the flow of liquid through said pipe, removing the damaged portion of said pipe, replacing said portion by a sound portion, and then thawing the section of the pipe to remove the ice plug therefrom.

7. A method of stopping the flow of liquid through a pipe to permit removal and replacement of a damaged portion of said pipe which portion has a hole therein, which consists in controlling the flow of liquid through said hole to initially reduce the escape of liquid through said hole and the flow through said pipe to a controlled trickle which escapes as a drip at a point intermediate the ends of the pipe, and then freezing the water within a section of the pipe upstream with respect to the point of escape of the drip to thus form an ice plug within said section which completely stops the flow of liquid through said pipe.

8. Apparatus for use in a process for stopping the flow of liquid through a pipe to permit removal and replacement of a damaged portion of said pipe which portion has a hole therein, comprising a member surrounding the portion of said pipe having the hole therein, said member having end portions adapted for sealing contact with the outer surface of said pipe and having an intermediate portion adapted with the outer surface of said pipe to form a passage for the flow of liquid from said hole, and an adjustable drip cock mounted on said member and having a valve controlled discharge passage communicating with said intermediate portion of said member for controlling the escape of liquid from said hole.

9. Apparatus as defined in claim 8, wherein the member is composed of two semi-cylindrical sections adapted for clamping engagement into tight surface contact with the pipe, and wherein a groove within the intermediate portion of the member conveys liquid from the hole in the pipe to the adjustable drip cock.

10. Apparatus as defined in claim 8 wherein the member has a rubber lining having end portions which effectively seal the ends of the member with the surface of the enclosed pipe, and wherein the intermediate portion of said rubber lining is provided with a groove which conducts the liquid from the hole in the pipe to the adjustable drip cock.

THOMAS NICHOLAS YOUNG.
ERIC GUY BRIAN GLEDHILL.

REFERENCES CITED

The following references are of record in the file of this patent:

UNITED STATES PATENTS

| Number | Name | Date |
|---|---|---|
| 2,257,727 | Bennett et al. | Oct. 7, 1941 |
| 2,261,028 | Hopkins | Oct. 28, 1941 |